Figure 1:
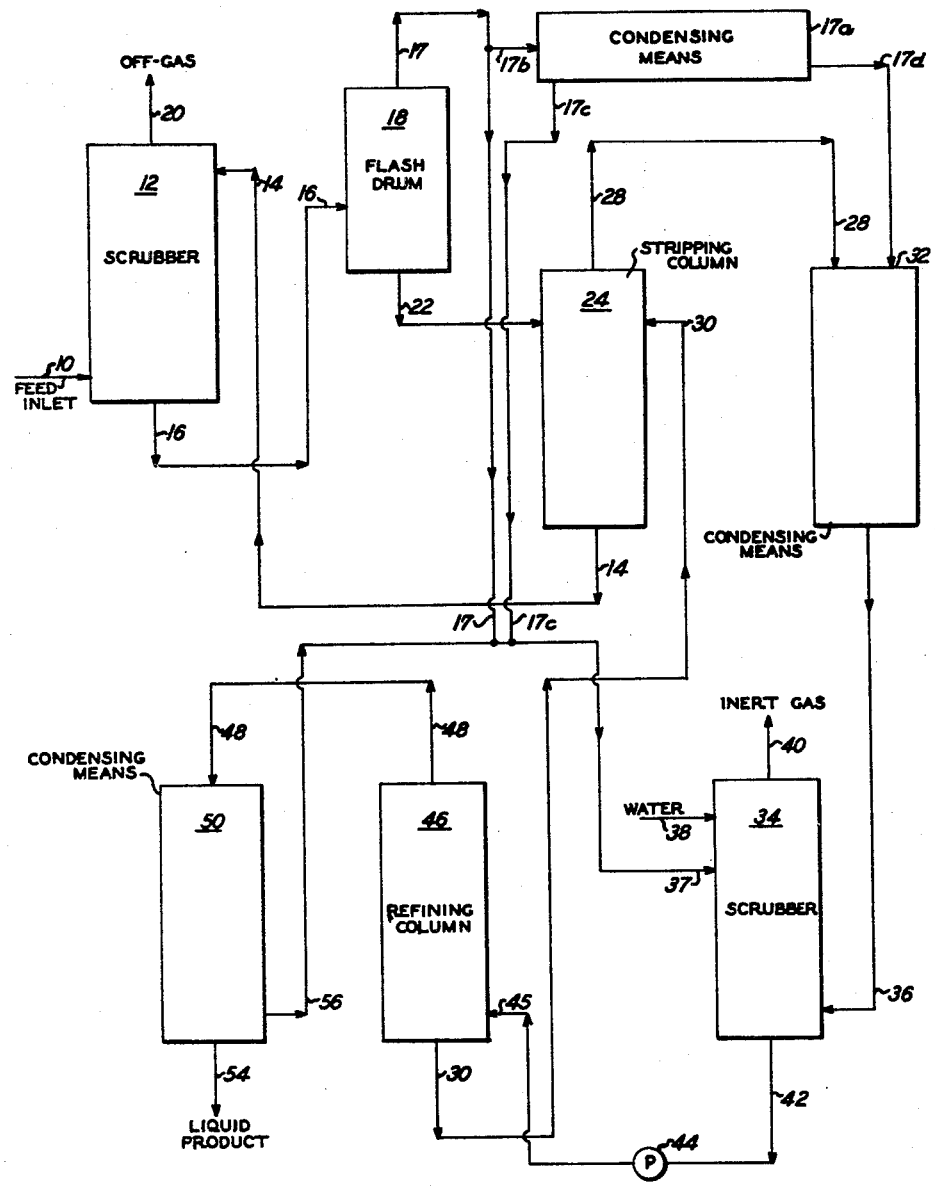

3,165,539
RECOVERY OF ETHYLENE OXIDE FROM A LIQUID MIXTURE THEREOF WITH NORMALLY GASEOUS IMPURITIES
John H. Lutz, Wyckoff, N.J., assignor to Halcon International, Inc., a corporation of Delaware
Filed July 8, 1960, Ser. No. 41,601
6 Claims. (Cl. 260—348)

This invention relates to a process for the recovery of ethylene oxide from a dilute mixture thereof with normally gaseous impurities, and more particularly to such a process wherein a first or inert rich gas fraction is separated therefrom and water scrubbed to remove ethylene oxide and the remaining inerts and the like discarded, and a second or inert lean gas fraction is separated and rectified to provide the desired ethylene oxide product.

The invention also relates to apparatus for performing this process.

An ethylene oxide containing mixture may be obtained by the oxidation of olefinic hydrocarbons, such as ethylene, and an aqueous solvent is usually employed to absorb the ethylene oxide component. The resulting ethylene oxide containing solution may be passed through a stripper column where a more concentrated ethylene oxide gas mixture is removed. The desired ethylene oxide product is only a minor part of the solution being stripped, and in commercercial operations, large and costly stripper columns or a large number of smaller columns are usually required. The art is confronted by the problem of providing a process and apparatus for the efficient recovery of ethylene oxide with minimum cost of capital equipment, as well as minimal operating costs.

The discoveries associated with the invention and relating to the solution of the above problems, and the objects achieved in accordance with the invention as set forth herein include the provision of:

A process for separating ethylene oxide from an aqueous mixture comprising ethylene oxide, carbon dioxide, and gaseous inerts, which comprises separating therefrom a first gaseous fraction rich in inerts, water scrubbing ethylene oxide from this fraction and discarding the remainder thereof, separating from the liquid residue a second gaseous fraction lean in inerts to produce a gaseous effluent, and rectifying this second gaseous fraction to recover ethylene oxide in substantially pure form;

Such processes wherein the first gaseous fraction is combined with inerts removed in the rectification of the second gaseous fraction, and the mixture is water scrubbed, with or without intermediate partial condensation;

Such processes wherein the water scrubbing takes place intermediate the separation of the second gaseous fraction and rectification of the latter fraction;

Such processes wherein the water scrubbing takes place subsequent to the rectification of the second gaseous fraction;

Such processes wherein the second gaseous fraction is compressed and rectified;

Such processes wherein the rectification step comprises gas stripping the second gaseous fraction, partially condensing the resulting gaseous effluent to obtain a liquid product stream and a stream comprising gaseous inerts, utilizing a portion of the liquid product stream as a reflux for the gas stripping step, and passing the stream comprising gaseous inerts to the water scrubbing step;

Such processes wherein the liquid residue resulting from gas stripping is used as a reflux stream in the step of separating the second gaseous fraction;

Apparatus for the separation of ethylene oxide from an aqueous mixture comprising ethylene oxide, carbon dioxide and gaseous inerts, which comprises a flash chamber for removing a major portion of the contained carbon dioxide and gaseous inerts from the aqueous mixture and rectification and partial condensation apparatus in operative relation to the flash chamber for removing the remaining portion of the carbon dioxide and gaseous inerts;

Such apparatus in operative relationship for removing the remaining portion of the carbon dioxide and gaseous inerts;

Such apparatus including in combination with a main scrubber column provided with a gas feed inlet, an aqueous scrubber inlet stream, a gas outlet duct, and a scrubber outlet line for removing an aqueous ethylene oxide containing a gas mixture comprising ethylene oxide, carbon dioxide and inerts, a flash chamber in communication with the scrubber outlet line for removing a major portion of the contained inerts from the aqueous ethylene oxide, a stripper column in receiving relation to the flash chamber for receiving aqueous ethylene oxide therefrom, a partial condenser disposed to receive the contained gases evolved from the stripper, a second scrubber column adapted to receive the condensate from the partial condenser, and to remove therefrom a scrubbed ethylene oxide containing mixture, a rectification column including a refluxing condenser for recovering substantially pure ethylene oxide, and a connecting line from the flash chamber to the second scrubber column for admitting therein the flashed inerts; and other objects which will be apparent as details or embodiments of the invention are set forth hereinafter, and in the drawings.

Figure 2:
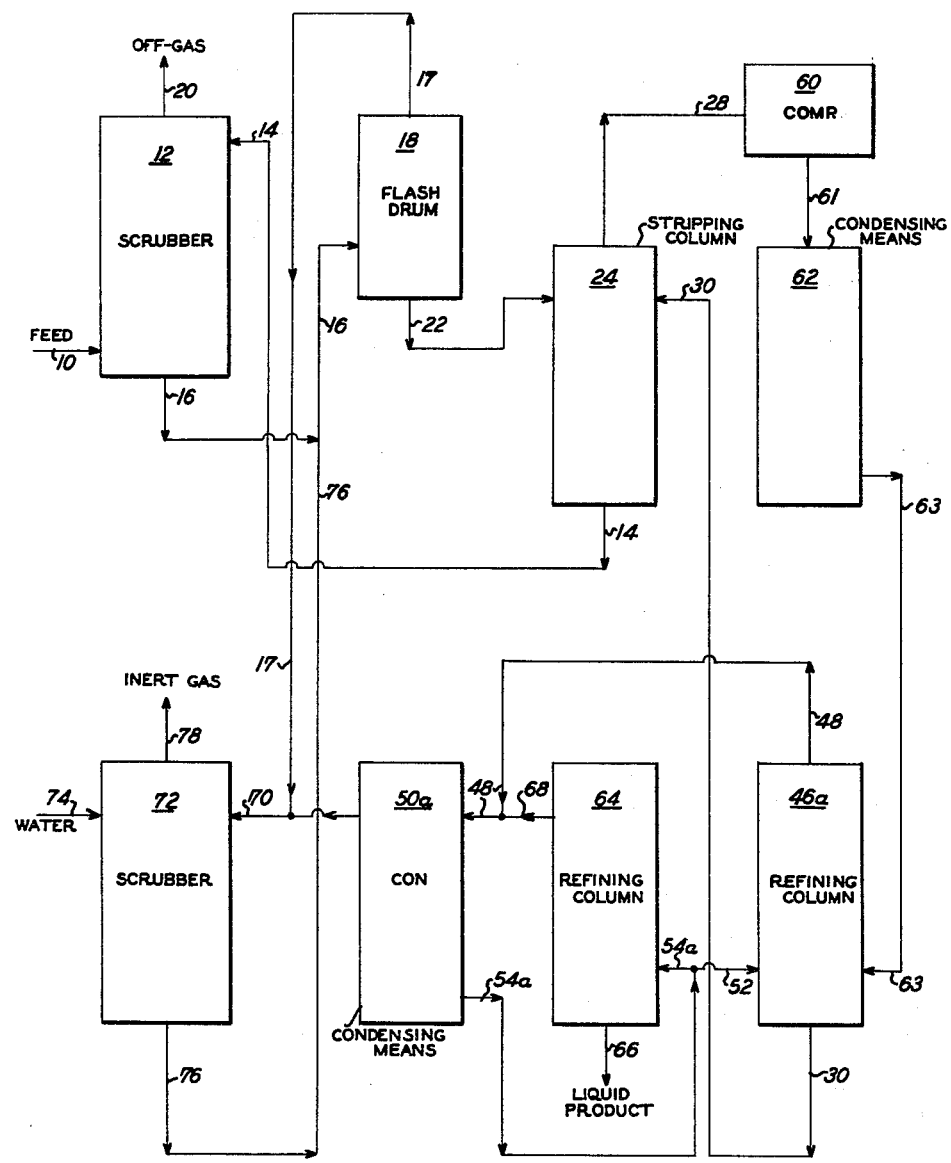

FIG. 1 is a flow diagram illustrating one embodiment of the present invention, and FIG. 2 is a flow diagram showing another embodiment thereof.

In order to indicate still more fully the nature of the present invention, the following examples of typical procedures are set forth in which parts and percent means parts and percent by weight, respectively, unless otherwise indicated, it being understood that these examples are presented as illustrative only and are not intended to limit the scope of the invention.

*Example 1*

Referring to FIG. 1, a gas feed mixture resulting from the catalytic oxidation of ethylene and comprising ethylene oxide, carbon dioxide, nitrogen and other inerts, and unconverted ethylene, is introduced into a feed inlet 10 of a main scrubber 12 comprising one or more scrubber columns (a single scrubber column being shown and described herein). Ethylene oxide and gaseous inerts are absorbed in a solvent, preferably water, introduced into the main scrubber 12 by means of a scrubber water feed line 14 connected to the upper end of the main scrubber. The resulting liquid effluent, comprising water, ethylene oxide (about 1 wt. percent) and inerts, is conducted from the bottom of the main scrubber 12 through a connecting line 16 into a flash pot or drum 18. The off-gas or gaseous effluent from the main scrubber 12, containing a considerable amount of unreacted ethylene, leaves the main scrubber through a duct 20 and may be further processed to recover additional amounts of ethylene oxide or may be suitably prepared for further conversion to ethylene oxide, thereby providing additional gas feed mixture to complete the catalytic oxidation cycle.

For this purpose, the flash drum 18 is maintained at a suitable pressure and temperature to effectuate the flashing conditions of the invention; e.g. 20 p.s.i.a. and 99° C. In passing through the flash pot 18, the bulk of the inerts in the aqueous mixture from the connecting line 16 quickly flashes into an inert rich gaseous fraction and passes through flashed inerts line 17, leaving behind a liquid residue of aqueous ethylene oxide containing a small amount of inert gaseous components.

Impure liquid aqueous ethylene oxide is discharged from the flash pot 18 into a discharge line 22 and then passed into the top of a stripper or stripping column 24. The lower part of the column 24 is suitably heated preferably by means of live steam or steam coils (not shown) under such conditions as to remove the ethylene oxide dissolved in the water and to form a column overhead to line 28 comprising ethylene oxide, inerts and steam; i.e. an inert lean gaseous fraction. The column 24 may also be provided with an aqueous reflux containing entrained ethylene oxide supplied by recycle line 30, to be described hereinafter, to remove the gaseous ethylene oxide fraction. The pressure in this column is 20 p.s.i.a.

The lean water in the stripping column 24, free of any substantial amount of ethylene oxide, is withdrawn from the lower part of the column 24 and recycled through the scrubber water feed line 14 to the main scrubber 12.

The effluent in line 28 is suitably cooled in a condensing means 32. This may be a partial condenser. The water present in the vapors leaving the stripping column 24 is condensed in means 32 to form a mixture of liquid and gaseous phases, the liquid phase or condensate comprising water, ethylene oxide and inerts and the gaseous phase comprising ethylene oxide and inerts. This liquid and gas mixture is passed into a reabsorber or secondary scrubber column 34, through a scrubber inlet line 36. The flashed inerts fraction in line 17, containing gaseous ethylene oxide, is admitted via gas line 37 into the secondary scrubber 34.

Alternatively, the flashed inerts fraction may be passed though lines 17 and 17b to a condensing means 17a. This means may be a partial condenser (properly cooled), in which case the resulting fluid (gas plus liquid) is passed through lines 17c and 37 to the scrubber 34 (at any convenient feed point). If desired, the liquid and the gaseous portions of the fluid may be separated and each passed to the scrubber 34 at any convenient feed point or points (not shown).

If the condensing means 32 is an absorber (with or without indirect cooling), absorbing liquid is added. This added liquid may be fresh water, introduced through an appropriate feed line (not shown). This added liquid may be the separated liquid condensate (from 17a) and this may be passed through line 17d to means 32.

Gaseous ethylene oxide is separated from the inerts by absorption in scrubber water which is admitted into the top of the secondary scrubber 34 by means of water inlet line 38. The inerts pass out of the secondary scrubber as gaseous overhead through vent line 40, and the remaining aqueous ethylene oxide, which is rich in ethylene oxide, is discharged from the bottom of the scrubber 34 through passage 42.

The ethylene oxide-rich water in passage 42, in which some inerts are still present, is compressed by means of a compressor pump 44 and then passed via line 45 into a refining column 46 equipped with suitable heating means, e.g. a steam coil (not shown). The refining column rectifies the aqueous ethylene oxide feed, as by steam stripping, producing an ethylene oxide overhead containing a small amount of inerts, which leaves the top of the refining column in effluent line 48. The effluent is condensed in a partial condenser 50, a portion of the condensate being recovered as substantially pure ethylene oxide in liquid product line 54. The uncondensed vapors comprising ethylene oxide containing a small amount of inerts pass through a conduit 56 and are merged with the flashed inerts in line 37 for subsequent selective absorption of the ethylene oxide component in the scrub water of reabsorber 34. If desired, the liquid product from line 54 may be stripped of gaseous impurities in another distillation and partial condensation system (not shown), the vapor from which may be passed to column 34.

The lean water remaining in the bottom of the refining column 46 may be utilized as scrub water if so desired. However any residual ethylene oxide in such scrub water may impair the efficiency of the system. Preferably, the bottoms effluent from the refining column 46, which normally comprises a certain amount of entrained ethylene oxide, is conducted through recycle line 30 and utilized as an aqueous reflux in the stripping column 24.

*Example 2*

Referring to FIG. 2, there is illustrated an arrangement adapted to operate at lower pressures. For this purpose, the pressure in column 24 is 9 p.s.i.a. and the column overhead to line 28, comprising ethylene oxide, inerts, and steam, as described in connection with FIG. 1, is compressed in a compressor 60 and cooled in a partial condenser 62 to provide an ethylene oxide-rich water containing a small amount of inerts, which is fed into the refining column 46a for rectification. The overhead leaving the refining column 46a for rectification. The overhead leaving the refining column 46a in the effluent line 48 is condensed in the partial condenser 50a and further rectified in a second refining column 64, resulting in a liquid bottoms effluent 66 of substantially pure ethylene oxide.

Gaseous effluent from the second refining column 64, comprising ethylene oxide and inerts is returned via line 68 to the condenser 50a. Uncondensed gases from the condenser 50a are merged with the flashed inert gases in line 17 and led through an inlet 70 of a second scrubber 72, wherein the gaseous ethylene oxide component is absorbed in a water wash supplied by line 74 and returned by return line 76 to the flash pot 18, and the inert components are vented through vent line 78.

As compared to usual processes, the procedures of these examples give efficient ethylene oxide recovery (quantity and quality) and use lower cost apparatus, especially a much smaller effective condenser area than is usually required (e.g. from a gas mixture in which the inerts remain). It also enables lower operating costs, especially in the embodiment of Example 1.

In order to effect a suitable flashing of the aqueous ethylene oxide mixture from the main scrubber 12, in accordance with the method of the invention, the flash pot temperature should be in the broad range between about 75° C. and 110° C., at pressures varying between 15 and 100 p.s.i.a. A pressure in the neighborhood of and slightly above atmospheric pressure is preferred because it reduces the need for utilizing high pressure equipment and does not involve maintaing vacuum conditions.

The column 24 is operated at a slightly elevated pressure or at a moderate vacuum, a pressure between 5 and 30 p.s.i.a. being preferred.

In view of the foregoing disclosures, variations and modifications thereof will be apparent to one skilled in the art, and it is intended to include within the invention all such variations and modifications except as do not come within the scope of the appended claims.

What is claimed is:

1. The process, for separating ethylene oxide from a liquid mixture which consists essentially of ethylene oxide, carbon dioxide, water and gaseous inerts, of introducing said mixture into a flash distillation zone, flash distilling said mixture at a temperature of 75 to 110° C. and a pressure of 15 to 100 p.s.i.a., separately removing a liquid aqueous fraction containing ethylene oxide and a gaseous fraction containing a major amount of said inerts from said zone, water scrubbing ethylene oxide from the said gaseous fraction, distilling said liquid aqueous fraction and recovering a gaseous overhead ethylene oxide fraction, and further distilling said overhead ethylene oxide fraction to produce ethylene oxide product.

2. The process of claim 1 wherein said gaseous fraction containing a major amount of said inerts is combined with inerts removed during distillation of the said overhead ethylene oxide fraction and the mixture is water scrubbed.

3. The process of claim 2 wherein the water scrubbing takes place intermediate the separation of the gaseous overhead ethylene oxide fraction and the further distillation of said fraction.

4. The process of claim 2 wherein the water scrubbing takes subsequent to the further distillation of said gaseous overhead ethylene oxide fraction.

5. The process of claim 4 wherein the gaseous overhead ethylene oxide fraction is compressed prior to further distillation.

6. The process of claim 1 wherein said gaseous overhead ethylene oxide fraction is gas stripped from said liquid aqueous fraction containing ethylene oxide, the resulting gaseous effluent is cooled to condense ethylene oxide and water, the condensate is separate from non-condensed inerts, a portion of the said condensate is used as reflux for said gas stripping step and the non-condensed inerts are passed to the water scrubbing step.

References Cited in the file of this patent

UNITED STATES PATENTS

| | | |
|---|---|---|
| 1,519,642 | Tobler | Dec. 16, 1924 |
| 2,043,103 | Kester | June 2, 1936 |
| 2,071,357 | Porter | Feb. 23, 1937 |
| 2,325,576 | Balcar | July 27, 1943 |
| 2,771,473 | Courter | Nov. 20, 1956 |
| 2,775,510 | Gardner et al. | Dec. 25, 1956 |
| 2,775,600 | Maslan | Dec. 25, 1956 |
| 2,786,805 | Sullivan et al. | Mar. 26, 1957 |

FOREIGN PATENTS

| | | |
|---|---|---|
| 558,618 | Great Britain | Jan. 13, 1944 |
| 564,646 | Great Britain | Oct. 6, 1944 |

UNITED STATES PATENT OFFICE

CERTIFICATE OF CORRECTION

Patent No. 3,165,539                                January 12, 1965

John H. Lutz

It is hereby certified that error appears in the above numbered patent requiring correction and that the said Letters Patent should read as corrected below.

Column 5, line 12, strike out "takes subsequent to the further distillation of said gaseous", and insert instead -- takes place subsequent to the further distillation of said gaseous --.

Signed and sealed this 22nd day of June 1965.

(SEAL)
Attest:

ERNEST W. SWIDER                             EDWARD J. BRENNER
Attesting Officer                               Commissioner of Patents